United States Patent [19]
Domenikos et al.

[11] Patent Number: 6,115,741
[45] Date of Patent: Sep. 5, 2000

[54] SYSTEMS AND METHODS FOR EXECUTING APPLICATION PROGRAMS FROM A MEMORY DEVICE LINKED TO A SERVER

[76] Inventors: Steven D. Domenikos, 54 Myrtle St., Millis, Mass. 02054; George C. Domenikos, 100 Boatswain Way #203, Chelsea, Mass. 02150

[21] Appl. No.: 09/356,225

[22] Filed: Jul. 16, 1999

Related U.S. Application Data

[63] Continuation of application No. 09/108,770, Jul. 2, 1998, which is a continuation of application No. 08/818,665, Mar. 14, 1997, Pat. No. 5,838,916, which is a continuation-in-part of application No. 08/616,746, Mar. 14, 1996, Pat. No. 5,838,910.

[51] Int. Cl.[7] .................................................. H04L 12/00
[52] U.S. Cl. .......................... 709/217; 709/216; 709/219; 709/227
[58] Field of Search .................................... 709/217, 216, 709/219, 227, 245, 250

[56] References Cited

U.S. PATENT DOCUMENTS

| | | | |
|---|---|---|---|
| 5,146,568 | 9/1992 | Flaherty et al. | 395/325 |
| 5,280,627 | 1/1994 | Flaherty et al. | 395/700 |
| 5,423,034 | 6/1995 | Cohen-Levy et al. | 395/600 |
| 5,504,892 | 4/1996 | Atsatt et al. | 395/600 |
| 5,838,910 | 11/1998 | Domenikos et al. | 395/200.33 |

OTHER PUBLICATIONS

Felten et al., "Web Spoofing: An Internet Con Game", Technical Report 540–96 (revised Feb. 1997), Department of Computer Science, Princeton University, pp. 1–9.

Andreessen et al., "Netscape Enterprise Vision and Product Roadmap", Netscape Products, Apr. 23, 1997, pp. 1–40. URL: home.netscape.com/newsref/std/index.html#white_papers.

Sharpe, "Just What is SBM", Copyright© 1996, Richard Sharpe, Dec. 1996 pp. 1–9.

Bch, "5.14—Mounting and unmounting File Systems", The Design of the Unix Operating System, pp. 119–141.

Callaghan, "WebNFS™, The Flesystem for the World Wide Web", Sunsoft, Inc. May 1996, pp. 1–20. URL:www.sun-.com/solaris/networking/webnfs/webnfs.html.

International Search Report.

*Primary Examiner*—Thomas R. Peeso
*Attorney, Agent, or Firm*—Foley Hoag & Eliot; Edward J. Kelly

[57] ABSTRACT

Systems and processes of the invention allow a computer to connect to a server of an Internet site for executing an application program that is stored on a disk linked to that server. Specifically, processes are disclosed that provide a data transport interface for connecting to the server. The processes transport from the server a server address signal representative of a network address of the server, and a path name signal representative of a file system that includes an application program. The process further generates a mount request as a function of the path name signal and transports the mount request to the server to direct the server to provide an array of server file pointers that point to a file descriptor representative of the file system that includes the application program. The processes generate an array of remote file pointers, as a function of the server address signal and the array of server file pointers, and provide the array of remote file pointers to a program loader that transports from the disk at the server site to a local program memory element, a file block associated with the selected remote file pointer. The process can employ a redirector that translates requests to access remote files into HTTP compliant commands for collecting files from an HTTP server site.

26 Claims, 9 Drawing Sheets

SYSTEMS AND METHODS FOR EXECUTING APPLICATION PROGRAMS FROM A MEMORY DEVICE LINKED TO A SERVER

This application is a continuation of Ser. No. 09/108,770 filed Jul. 2, 1998, which is a continuation of Ser. No. 08/818,665 filed Mar. 14, 1997, now U.S. Pat. No. 5,838,916, which is a continuation-in-part of U.S. Ser. No. 08/616,746 filed Mar. 14, 1996 is now U.S. Pat. No. 5,838,910 and entitled "Systems and Methods for Executing Application Programs from a Memory Device Linked to a Server at an Internet Site," the teachings of which are incorporated herein by reference.

FIELD OF INVENTION

The present invention relates to systems and methods for connecting a computer to a computer network, and more particularly, to systems and methods that allow clients to execute application programs stored at a server site.

BACKGROUND OF THE INVENTION

The digital computer is a powerful data processing tool that allows a user to organize, store and analyze data in volumes and at rates that would be impossible by any prior known technique. The computer network has been a similar step forward. By linking together several computers and by providing shared resources and cross-platform communications, engineers have developed the computer network into a tool that provides sufficient processing power to support entire corporations and universities. The increased power of computer networks over the individual microcomputer is provided by distributed processing. Distributed processing allows for the division or distribution of a computational workload among the different workstations connected to the computer network.

One of the most widely accepted and heavily used computer networks is the Internet. The Internet is a global system of interconnected computer networks formed into a single worldwide network. A user, through the Internet, can interactively transmit messages with users in different countries. Similarly, a user in the U.S. can access the files from libraries in Europe and Asia and download these files for personal use. Accordingly, the Internet provides strong communication functions similar to the communication functions provided by ham radio operators. Moreover, the Internet acts like a universal library, providing electronic access to resources and information available from Internet sites throughout the world.

Although the Internet provides excellent and developed resources for communication and file sharing, the Internet is still basically a static medium. In other words, the content of the Internet, i.e., the resources available to a user accessing a site on the Internet, is mostly stored data. Typically, a user moves about the Internet using a web browser program. The web browser program allows for multimedia presentation of stored data including text images, sound clips and video clips. This allows the user to connect via the Internet to different sites on the Internet. However, although a user can view the information stored at an Internet site, and even make a copy for their own personal use, at present, a user lacks a suitable system for directly executing an application program. As such, the Internet generally fails to provide the advantages of distributed processing.

It is, in part, the size of the Internet that has impeded the availability of client/server applications on the Internet. In particular, because the Internet is so vast and open, companies and universities have disposed firewalls between their internal servers and the Internet. These firewalls deny access to useful applications by preventing existing systems, such as NFS and SMB, from accessing the applications. As such, the firewall acts as a barrier that prevents the use of traditional networking systems from executing client/server applications.

In response to this problem, systems have been proposed that provide for application programs that move between an Internet site that stores the application program and an Internet site that services a user wishing to use that application program. One such proposed system is the JAVA system proposed by Sun Microsystems. The JAVA system provides an interpreted language system that can be operated by the Internet user to download and run small application programs, referred to as applets, located at a remote Internet site. Accordingly, the JAVA system provides a form of distributed processing in that application programs located at Internet sites are being made available for distribution to Internet users. This is a significant advance over the prior functions available to Internet users which previously were limited to merely viewing and transferring stored data.

However, although JAVA offers an improvement over the prior art, the JAVA system suffers from some significant drawbacks. First of all, the JAVA system requires that each application that is to be downloaded to an Internet user and run at the Internet user's site, has to be written in the JAVA programming language. Therefore, available program applications such as Microsoft Word, Microsoft Excel, Intuit Quicken, or other developed application programs must be rewritten in a JAVA compatible programming language before they can be employed with the JAVA system. This of course creates an immediate barrier to the deployment of application programs across the Internet. Moreover, a significant debugging effort will be required as these rewritten applications are not proven code and inevitably will fail either due to bugs created during the rewriting of the program or bugs created by the JAVA system. Moreover, the proposed JAVA system is an interpreted language system, and interpreted language systems are notoriously slow. Consequently, Internet users are likely to notice a substantial decrease in operation speed while they run these applications.

Additionally, JAVA applications available for deployment from an Internet site are programmed specifically for Internet deployment. Accordingly, these JAVA application programs will not be the programs typically employed by users. Instead, it is likely that users will operate non-JAVA programs which are different from those JAVA programs deployed over the Internet. Accordingly, a compatibility rift will develop between Internet users at remote sites and users at the host sites. As such, the JAVA system inherently provides a barrier between users at remote locations and users at host sites.

Accordingly, it is an object of the invention to provide systems that allow for deployment and execution of application programs across the Internet.

It is a further object of the invention to provide systems capable of negotiating Internet firewalls.

It is another object of the invention to provide systems that integrate remote users with the Internet network of the host site.

It is still a further object of the invention to provide systems that deploy existing application programs across the Internet, without having to rewrite the applications.

It is a further object of the invention to provide a system for deploying applications across the Internet that provides programs which execute quickly at remote sites.

These and other objects of the invention will be made apparent from the following description of the invention.

SUMMARY OF THE INVENTION

Systems and processes according to the invention allow a computer, typically referred to as a client, to connect to a server of an Internet site for executing an application program that is stored on a memory device linked to that server.

The methods of the invention can include methods for allowing a client to execute an application program stored on a memory device linked to an HTTP server, and can comprise the steps of mounting a remote file system containing the application program and being linked to the HTTP server, monitoring the operating system to detect file system requests for files stored within the remote file system and passing the file system requests to a redirector element for translating the file system requests into HTTP compliant signals for transmission across a network. In this practice of the invention, the step of mounting can include the step of generating an array of file pointers representative of pointers to files associated with the application program.

In a further practice, the processes of the invention can include the step of providing plural redirector elements for translating the file system requests into a selected one of plural transport protocols. For example, the client element can have a network interface to a plurality of different networks each of which use a different file transport protocol, such as NCP, NFS, SMB or any other of the open or proprietary services that provide protocol for transmitting or sharing data, such as files, across network media. In this practice, each one of the redirector elements can be adapted for employment with one or more of the data transport protocols, thereby allowing the client element to access any one of a plurality of servers each having a different remote file system. The process can include a step of selecting one of the plural redirector elements to translate the file system requests. The step of selecting the redirector element can be made as a function of any suitable criteria or characteristic including the types of file systems, as well as a measure of the transmission latency time of each of the networks, as well as the transmission protocols of the networks. In one practice of the invention, the plural redirectors are provided with a wrapper interface that, in a way, encapsulates each of the redirector elements such that all the redirector elements are provided with the same interface to the operating system of the client computer. This is understood to provide portability and to reduce the complexity of the overall system.

The term "redirector" as used herein will be understood to encompass a program or process that can direct a request for data or services to a selected source of data or services and optionally can translate file system requests into commands or data signals that comply with at least one network protocol for transmission of data across network media.

In a further embodiment, the processes of the invention include the further steps of providing the client with access to a cache memory for cache storing portions of the file system which contain the application programs, and a further step of providing a cache redirector element that responds to client file requests by accessing portions of the file system stored within the cache memory. The accessed portions of the file system can be employed for running the application program within the clients local program memory. In one practice, the process can include the step of directing the cache memory to mirror the file system being stored therein. Accordingly, in this practice, a mirroring process can operate such that as changes are detected within the file system being exported by the server, the file, and file or directory structure maintained within the cache memory device, are similarly updated. Optionally, this mirroring can be done automatically, or upon the instruction of the user.

In a further practice, the processes of the invention can include a step of storing the portions of the file system according to a file or directory structure that is employed by the server. Accordingly, the cache memory device can store information that is representative of the files for executing the application program, as well as the information representative of the directory structure associated with these files. This directory structure can include directories, subdirectories, paths and other directory structures. Moreover, the directory structure in the cache can conform to the file system employed by the server, so that, for example, Windows clients can store a UNIX file structure in the cache memory.

In a further practice, the processes of the invention can include the step of providing an off-line page which is representative of at least one link to an application program stored within the cache memory. The off-line page can be an HTML page stored within a memory device accessible by the client and made available for connecting to files stored within the cache memory device of the client. Upon invocation of the off-line page, the user can activate links within the page to cause the execution of application programs stored within the cache memory device. In a further practice of the invention, the processes of the invention can include the step of providing a preload control for allowing a client to store selectively an application program within the cache memory. Accordingly, the preload control will allow a client to select application programs stored at a server site and made available by the server for exporting to a client, to be stored within the cache memory device, for employment by the client without requiring access through a computer network.

In a further practice, the methods can include the step of providing a process for directing the server to execute the application programs within the program memory of the server. In this way, methods of the invention can also include functionality that allows a client system to act as a terminal while a program executes within the server program memory, thereby allowing a user to select between executing the application program within the client program memory, or alternatively executing the application program within the server program memory.

In a further embodiment, the invention can be understood as methods for allowing a server to provide remote execution of an application program stored on a memory device linked to the server. The processes can include the steps of generating an application information file that is representative of files associated with the application program. In a further step, the processes will generate a link representative of a pointer to the application information file, and detect a request from a client to execute the application program. Responsive to the request, the processes of the invention can transmit data signals to the client which are representative of the files associated with the application program. In one practice of the invention, the step of generating an application information file can include the step of generating information that is representative of a file or directory structure associated with the files of the application program. In this way, the application information file can include information that is representative of the files associated with the application program as well as the file or directory structure that is employed by the server for maintaining the application programs in a format that is suitable for executing.

The methods of the invention can also include the step of generating an application file that includes information which is representative of the operating environment for the application program. In this way the application information file can contain information that allows the client to reconfigure the local operating environment to accommodate the application program.

In a further embodiment, the processes of the invention can include the steps of providing the server with a link to a second server, and directing the server to identify to the client those application programs that are stored on the second server and which are made available for execution by the client. This allows the server to advertise to the client those application programs which are being made available by other servers and which can be invoked by the client. This provides the client with access to the applications available on a plurality of different servers. Optionally, the server can create links to the application programs available at other servers. The client will employ those links to execute these application programs.

In a further practice, the processes of the invention can include a step of providing a metering process for monitoring the number of clients running the application program. Optionally, the metering process can generate statistical information that identifies certain characteristics of the use of the application and which can be provided to a system administrator for administrative functions, such as to allocate resources more appropriately.

In yet a further embodiment, the processes of the invention can include the step of providing an access control process for allowing the server to control a client's access to the application program. In this embodiment, the server can include an access control process that requires authentication, either by password or other key, to limit to a selected group those clients which can access application programs maintained by that server, or by other servers.

In a further embodiment, the processes of the invention can include processes that allow a client to install an application program stored on a memory device linked to a server. These processes can include the steps of providing the server with access to an installation program for installing the application program for operation by the server, generating an application information file that is representative of files associated with that installation program, detecting a request from the client to install the application program locally, and transmitting to the client, responsive to the application information file, data which is representative of the files associated with the installation program. In this practice of the invention, the processes can also include the step of generating an application information file that has information representative of files associated with the application program.

In a further embodiment, the invention can be understood as server processes that allow a client to execute locally an application program stored at a memory device of a server. These processes can include the steps of providing an HTTP server process that can access a memory device having storage for one or more server directories that store files associated with an application program, including the executable code of the application program. The server provides the client with access to the files and directories, and the client can cache portions of the file system containing the application program, and employ a cache redirector element to access the portions of the file system that is stored within the cache memory.

The term "client", as used herein, encompasses any data processing system suitable for operating a process according to the invention. The term "server" can encompass any process running on a data processing platform that connects into a computer network and that receives access requests, whether under HTTP, FTP or any other conventional or proprietary protocol. The term "application program" as used herein, encompasses any computer file or set of files that contain data in a format for being accessed and processed by the processing unit of a computer system. The term "memory device" as used herein, encompasses any device that can store computer readable data and that provides an interface for accessing the stored data, and can be understood to include volatile and persistent memory devices, including hard-disks, RAM, network disks, and any other suitable data storage system.

The term "file system" as used herein encompasses logical structures that define the relationship between files, directories, disks, devices and ports that are stored on or linked to a computer system, and include file systems of directory structures that define the hierarchical relationship between stored files, disks, disk partitions, file blocks, devices or other sources of computer data.

The term "server address signal" as the term is used herein, encompasses any description that identifies a network address of a server. The term is understood to include any description for an Internet address of a server including any host number, any host name, any domain name or any other description sufficient to identify the network address of a server. The term "path name signal" as used herein encompasses any description suitable for providing an operating system with information for identifying one or more components of a file system including a file, a directory, a sub-directory, a device, a port or any other directory primitive.

In a further embodiment of the invention the system can include a server element that has an administration program for storing on the disk at least one file system of computer files stored according to a selected file system protocol. One such administration program can include means for storing a file system of computer files according to one or more of a DOS, UNIX, VMS, WINDOWS, WINDOWS 95, WINDOWS NT, OS/2, or SYSTEM 7 file system protocol. In a further embodiment of the invention, the system can include a connection element that includes an element for generating a call to a port of a server HTDP process. For example, the connection element can include a connection program that generates a call to the port 80 of the server process. Port 80, a well known port, provides the Internet address of the HTTP server operating the process coupled to the client system.

In a further embodiment of the invention, the server includes a file sharing program. The file sharing program can be NFS, SMB or HTTP compliant, and the file sharing program can create an array of file pointers, such as a Unix inode, which can be understood as an array of pointers to computer files stored on the server system.

These and other embodiments of the invention will be more clearly understood by reference to the following detailed description and attached drawings, in which like reference numbers refer to like elements.

DETAILED DESCRIPTION OF THE INVENTION

Figure 1:
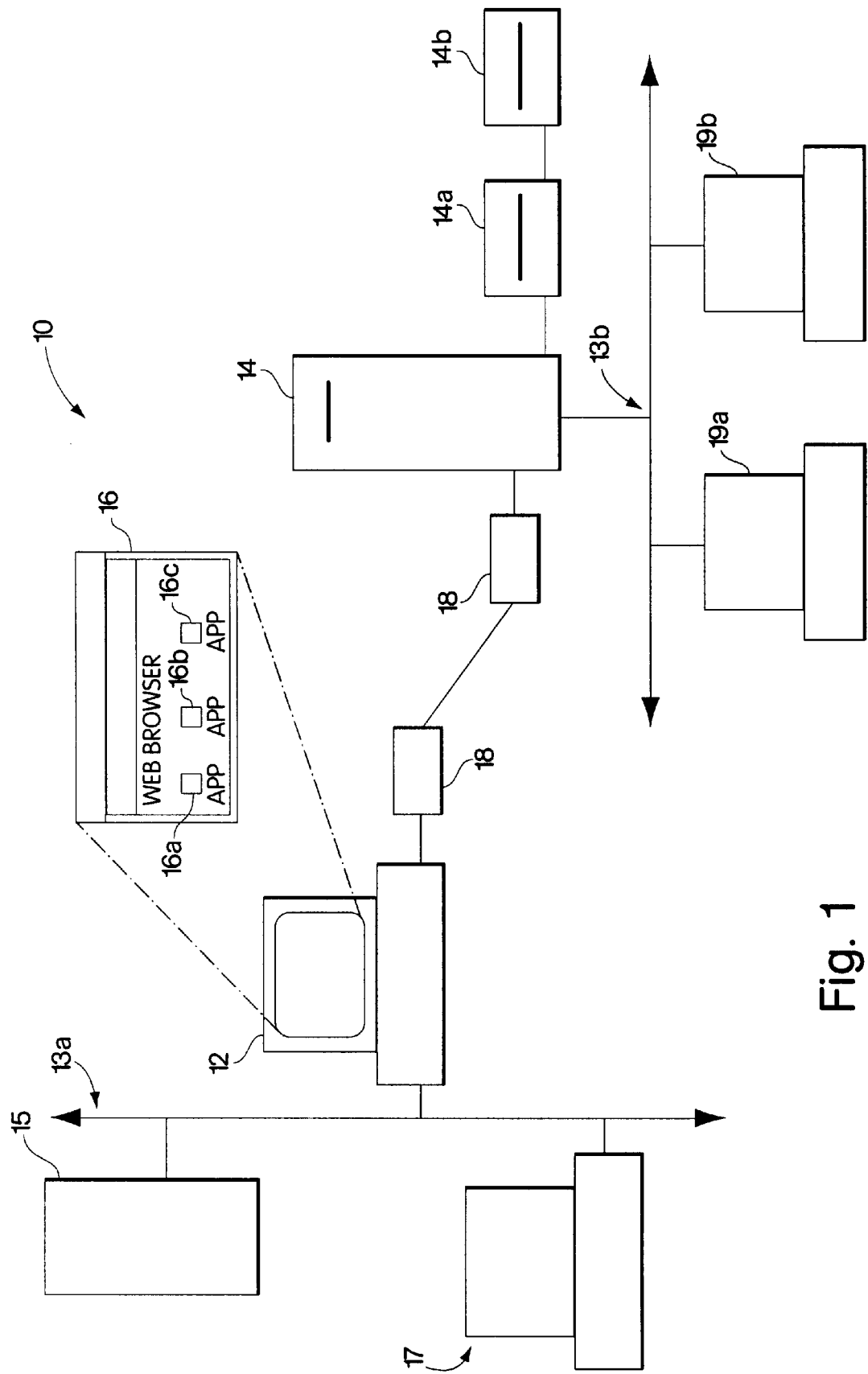
FIG. 1 illustrates one system according to the invention for establishing a connection to an Internet site and for executing application programs located at that site.

The invention comprises, inter alia, systems and methods that enable a web site administrator to provide links to remote applications within their web pages. One realization of the invention is that a remote client can be allowed to execute an application program stored at a HTTP server. To this end, the invention provides the server with access to a remote file system, and with access to a file that can contain information of the files, directory structure and system environment associated with the application program. The invention can also include a system for allowing the client to mount the portion of the shared file system that includes the application program. The system can include an HTTP redirector element that translates operating system requests to access portions of the shared file system into HTTP compliant commands. An HTTP server at an Internet site responds to the commands and provides access to the HTTP server directories. Accordingly, the HTTP redirector creates a drive connection to the server directories to provide a client with access to files stored therein. This provides an HTTP shared file system. In this way, a remote application can be mounted into the client file system and then run from within a window of a browser program or from a launching program. Optionally, the links can appear as program icons within the window of the browser or launcher program.

It will be understood that one advantage of the systems and methods according to the invention is that legacy applications available for execution within a corporate network can be readily launched over the Internet, an Intranet, or other network system, and executed within a window of a browser or launcher program.

To this end, the systems and methods of the invention provide the ability to create links that appear within a browser type program, and which can link the client to an application information file that is maintained at the server side of a network connection and that contains information for running the application program. The application information file can identify those files, such as *.exe files and *.dll files, that the client will employ to run the application within the program memory of the client. In one practice, the server makes these files available to the client via a shared file system. Optionally, the client can use a transfer protocol to download the files from the shared file system and to store the files within a cache memory system that is connected to the client. The client can then, optionally, run the application locally out of the cache memory. Alternatively, a program loader process operating on the client can load blocks of executable code of the application program to the local memory of the client and the code can be executed from that local memory.

The invention will now be explained with reference to certain illustrative embodiments, which are exemplary and not to be understood as a limiting, or an exhaustive representation of the invention.

FIG. 1 depicts a system 10 according to the invention for accessing, deploying, and executing application programs stored at a drive linked to a server, and in particular to an HTTP compliant server. In particular, a website administrator can employ the systems of the invention to provide a user with access to application programs stored at different network locations, including Internet and Intranet sites. As illustrated in FIG. 1 the system 10 includes a client element 12, computer LANs 13a and 13b, an HTTP server 14, memory devices 14a and 14b, a server 15, a network node 17, an optional program interface 16, optional application icons 16a, 16b and 16c, communication elements 18 and network nodes 19a and 19b.

The client element 12 depicted in FIG. 1 can be a commercially available PC compatible computer, Unix workstation or any other data processing system suitable for running a process and for operating a communication interface that provides a communication link with a server site. Moreover, the client 12 can be a stand alone computer system or, as depicted, a networked computer system. The client 12 can include a telecommunications element 18, such as a modem, and also includes a browser, or launcher, program, such as the Netscape browser, which is suitable for establishing a connection to an HTTP server. In the embodiment depicted by FIG. 1, the browser preferably provides an optional graphical interface 16 that allows a user to control and direct the operation of the system 10 to access and execute selected files. The depicted graphical interface 16 displays an application icon element, such as 16a, that provides a graphical device for a user to activate an associated application program stored at a memory device, such as disk 14a, linked to server 14.

FIG. 1 further depicts an HTTP server site that includes a server element 14 that connects to the communications element 18 and the memory devices 14a and 14b. The server 14 can be any server element suitable for running an HTTP server process that can be accessed by a client, such as client 14. Typically, the server 14 is a data processing system that runs one or more server processes for maintaining an Internet or Intranet site that includes one or more files for network access. In the embodiment depicted in FIG. 1, the server 14 connects to two memory devices 14a and 14b, depicted as external disk drive systems. The memory devices 14a and 14b can be local memory storage for the server or can be remote storage that is linked to the server 14. Each disk drive system can maintain a set of computer files, including directories and files of executable application program code, which the server can access and control. The server 14 can be a stand alone computer system, or as depicted, the server can be a networked computer system, having one or more data processors that can access local or networked memory devices.

FIG. 1 illustrates that the systems of the invention extend the capabilities of the World Wide Web by enabling web site administrators to provide web pages that have links to remote applications. Moreover, the web site administrator can employ the systems of the invention to provide transparent installation of an application program at the client site. This allows a web site administrator to make applications, including legacy applications, stand alone applications and client/server applications, available for execution within a corporate Intranet and across corporate bounds through a browser or launcher program. This is shown in FIG. 1, by the server 14 that connects to the communication element 18, the memory devices 14a and 14b and the LAN 13b. For example, a network administrator charged with providing users with access to certain application programs, such as an application program for allowing a user to invest in mutual funds, can store the application program on one of the memory devices 14a or 14b. The site administrator can install a server process on the server 14 that allows users at the nodes 19a or 19b to access the application program and to execute the program for investing and managing funds. Accordingly, the site administrator is able to provide this application program to users connected to the LAN 13b. The systems and methods of the invention allow the site administrator to provide remote clients with access to the application program. For example, an HTTP server process can be installed on server 14. The HTTP server process will provide links within HTML pages that will link a remote client to an application information file that is associated with that link and that can store information representative of the components, environment, and other data relevant for executing the application program. The client's browser 16 will display the HTML page showing the links as graphical devices, such as 16a. The client can mount the shared file system containing the remote application components, create the environment appropriate for running that application, and invoke the application. The application can run locally within the client memory. Upon termination of the application, the client notifies the HTTP server process and the server process no longer services the client.

FIG. 1 further depicts that the client element 12 can also access programs and files controlled by a local server, such as server 15, to which the client 12 is connected by the local area network 13a. In particular, FIG. 1 shows that systems of the invention can be integrated into existing LAN technology to allow a client to execute application programs provided by a corporate network, such as an Intranet running on LAN 13a, as well as applications stored at a remote site such as the HTTP server 14. Accordingly, by combining the systems and methods of the invention with existing Intranet technology, a node on an Intranet can have access to application programs stored at a remote site, with the systems of the invention providing transparent access to the application programs at these remote sites.

Figure 2:
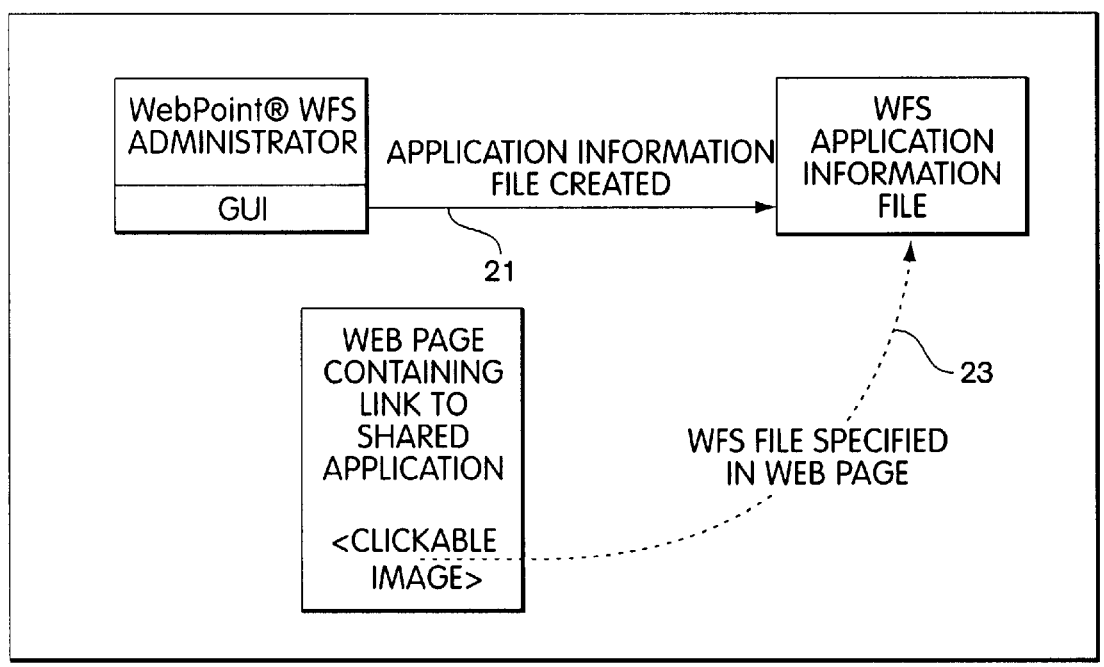
FIG. 2 illustrates one process for creating a link to an application program at an HTTP server.

FIG. 2 depicts one process for providing a web page application link. In this process, the application program is provided within a shared directory, or an exported file system. The directories are to be shared through a file system server such as a LAN manager system, the NFS system, the NCP system or any other suitable file system server, or optionally by employing the HTTP redirector, can be placed on an HTTP server. For the application program in the shared directory, the web site administrator can, as shown by step 21, generate an application information file for the remote application. Optionally, the file can be created automatically by a process executing on the server.

This application information file contains information necessary for running the remote application on the client. For example, the application information file can include the executable files (i.e., EXE files), the initialization files (i.e., INI files), systems files (i.e. SYS files), directory structure information, and any other information or configuration parameters that will identify the proper environment for running the application. A process operating on the client, appropriately configures the operating environment to allow proper execution of the application program.

After creating the application information file, the process in step 23 can embed within the HTML page exported by the server, an icon that refers to a link to the application information file. Optionally, a set of access rules to the application link can be defined. This is typically done during the development of the application link and the access rules can include definitions as to which set of users and or clients are permitted to execute the application from the link, how many occurrences of the application may be running simultaneously, requiring a user to pay a predetermined fee, or any other such type of access rule. If the access control is satisfied, the application program, can be invoked.

From the above description, it will be apparent that the systems and processes shown in FIGS. 1 and 2 can be operated on commercially available hardware, and typically can be installed by a site administrator onto an existing LAN, such as the network 13b. For example, each memory device 14a and 14b can be a commercially available hard disk system, or a partition of a hard disk system, a RAM card system, or computer RAM memory. However, it will be apparent to one of ordinary skill in the art of computer engineering that any memory device suitable for storing data and for interfacing to a data processor or a computer network can be practiced with the present invention, without departing from the scope thereof.

The communications elements 18 are figuratively depicted as modems for maintaining a telecommunication link between the client 12 and the server 14. However, the communication elements can also be ISDN devices, fiber optic devices, cable devices or any other type of communication device suitable for establishing a communication link to a remote site. The local area networks can be ethernet systems, or any network system suitable for carrying data between data processing systems.

Figure 3:
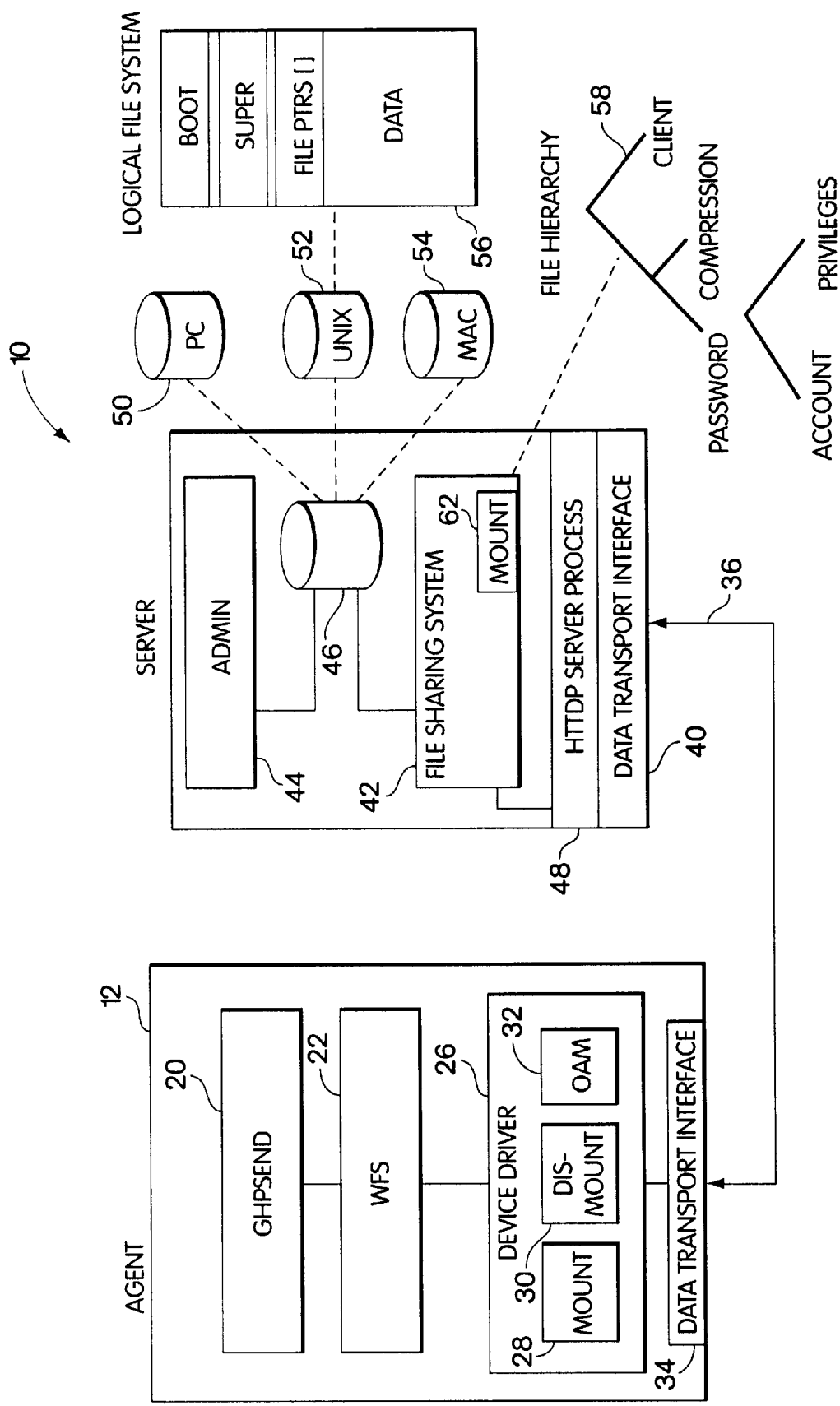
FIG. 3 illustrates in greater detail the system illustrated in FIG. 1.

FIG. 3 depicts in more detail the system 10 of FIG. 1, and depicts system 10 in a state before the client 12 has requested to execute an application program stored on the server 14. FIG. 3 depicts a system 10 that includes the client element 12, the server element 14, a handle collection element 20, a file system 22, a device driver 26, a disk mount element 28, a disk dismount element 30, an organization and management element 32, a data transport interface 34, a transmission path 36, a second data transport interface element 40, a file sharing system 42, an administration program 44, a memory element 46 having a PC partition 50, a Unix partition 52 and a Mac partition 54, wherein at least one of the partitions includes a logical file system such as file system 56, and further including a file hierarchy structure 58 of files accessible to the server 14.

FIG. 3 depicts each functional block as an element of the system 10. However, it will be apparent to one of ordinary skill in the art of computer and software engineering that each element can be a software routine that operates on a data processing unit to configure the data processing unit to operate as the device depicted as system 10 or as a subsystem of the system 10. Moreover, it will be apparent to one of ordinary skill in the art of computer and software engineering that the functional blocks depicted can be combined elements of hardware and software that operate to implement the functions of the system 10.

As depicted in FIG. 3, the client 12 includes a data transport interface element 34, which typically is a TCP/IP interface suitable for establishing connections to an Internet or Intranet site. The browser program process running on the client 12, such as the Netscape Internet browser, interfaces with the TCP/IP data transport interface element 34 to transfer data under the TCP/IP protocol to the server 14. Similarly, the handle collection element 20, the mount element 28, the dismount element 30, and other elements of the system 10 employ the TCP/IP data transport interface element 34 to transfer data and commands between the client 12 and the server 14. The interface element 34 can be any conventional Internet protocol interface, such as any program that follows the Winsock protocol for interfacing Windows operating system programs to the Internet, such as the Trumpet Winsock TCP/IP data transport interface program. However, it will be apparent to one of ordinary skill in the art of computer engineering that any system suitable for transporting data on an IP network can be practiced with the present invention without departing from the scope thereof.

In the depicted embodiment, the server element 14 also includes a TCP/IP data transport interface 40 which connects via the transmission path 36 to the data transport interface 34 of the client element 12. The data transport interface 40 transports data and control information to and from the server 14 thereby providing a transport layer for supporting the file sharing system 42 and the administration program 44. The development of servers that include integrated transport layer protocols is well known in the art of computer engineering and any transport protocol layer that allows for the exchange of data between the client 12 and the server 14 is suitable for practice with the present invention and considered within the scope thereof.

As further illustrated by FIG. 3, the depicted server 14 includes a server process 48. The server process 48 interfaces to the data transport interface 40 to connect the client 12 to the server 14. In one preferred embodiment of the invention, the server process 48 is a web server process for providing HTML pages to the client 12 in response to hypertext link-requests from the client 12, as well as other elements of the system. The server process 48 is a program that implements the process of the invention and that is constructed according to known principles in the art of computer and software engineering.

As further depicted in FIG. 3, the server 14 includes an administration program 44 which configures the server 14 for providing executable application programs to the client 12. In one embodiment, the administration program 44 includes a partition program for partitioning the memory device 46 into several logical sections, depicted as sections 50, 52 and 54, each of which can have a device name and each of which can contain a logical file system 56. The construction of such partition programs is well known in the art of software engineering.

In the embodiment of FIG. 3, the partition program creates the logical section 52 for storing data according to the Unix file system protocol. As depicted, the partition 52 includes a logical file system 56 consisting of one file, for which the file system 56 includes a boot block, a super block, an inode list that represents an array of pointers to a set of data file blocks that represent the physical location of the data on the disk 46. The file system 56 can be the conventional UNIX operating system file system. As further depicted by FIG. 2, each logical disk partition section can be employed by the administration program 14 for storing different types of computer files according to different logical system file protocols such as DOS, UNIX, VAX, or any other file system protocol wherein each logical disk section includes a logical file system 56 that provides to a program loader, or the device driver that communicates to a program loader, the low level information representative of the physical disk location on which it is stored the files of the associated disk partition.

In one embodiment of the invention, the administration program 44 includes a partition subroutine that creates each logical section 50, 52, and 54 to provide a file system of computer files that can contain application programs for running on any type of client 12 that may connect to the Internet site. Such subroutines are well known in the art and any suitable subroutine or operating system call can be employed by the invention. Specifically, the administration program can be employed to subdivide the disk 46 into logical sections for each different type of client 12. Typically, the type of client is determined by the type of operating system the client runs as well as the type of processor employed by the client 12. Each client 12 would provide the server 14 with a client-type signal that allows the server 14 to determine which logical section of the disk 46 maintains files suitable for that particular client. For example a client 12 that operates under the Unix operating system, can access the files stored under logical section 52 and a 486 PC compatible computer running DOS would access logical section 50. The administration program 44 that implements the process of the invention can be constructed according to well known principles of software engineering as a software module, such as a complied C++ software module, that employs system calls to the server operating system, such as the UNIX operating system. However, it will be apparent to one of ordinary skill in the art of computer and software engineering that any structure that implements the function of the administrative program can be practiced with the present invention without departing from the scope thereof.

In a further embodiment of the invention, the administration program includes a file access control program that determines as a function of a client privilege signal, the access rights available to the client 12. In one embodiment, the file access control program includes a database of client identification signals. In this embodiment, the management program 32 includes a client management program that provides a client identification signal that uniquely identifies the client 12. The file access control program includes a database of client identification signals and further includes a client privilege field for each client identification signal. The file control program employs the client privilege field to determine the file access rights of the client 12. The file access control program provides the file access rights to the administration program 44 which can determine the proper file system or disk partition to make available to the client 12.

Accordingly the administration program can provide a licensing and security system for the system 10. It will be apparent to one of ordinary skill in the art that any file access control program suitable for controlling the files that are mounted into the server file system hierarchy 58, or that controls the copy of the server file pointers provided to the client 12, including password systems, on-line charge systems, or any providing other such system for controlling file access rights can be practiced with the present invention without departing from the scope thereof. The administration program 44 can also include the process that allows an administrator, or optionally a client, to create and configure application information files which can be specified as links in web pages. In a further embodiment, the administration program 44 can contain a process that monitors system use and generates statistics that allow the site administrator to track and control resources.

In a further embodiment of the invention, the management element 32 includes a client management element that provides to the server 14, along with the client-type signal, a client file having information signals representative of the characteristics of the client. These characteristics can include the memory size of the client, the available program memory, the system configuration, including the config.sys file, win. ini file, configuration files for local applications and the file names of one or more of the systems stored on the client 12. The administration program 44 employs this information to determine which files to provide the client, as well as for other conventional management functions.

In the depicted embodiment, the administration program 44 is separate from the server process 48, however it will be apparent to one of ordinary skill in the art of computer and software engineering that the administration program can be implemented as part of the server process 48.

The file sharing system 42, depicted in FIG. 3, communicates with the memory device 46 and allows the server element 14 to read and write information, such as computer files, to and from the memory device 46. The file sharing system 42 further maintains the file hierarchy 58 for the server 14 to provide thereby the logical structure for accessing and managing computer files which are stored as data blocks within the memory device 46.

The file sharing system includes a mount procedure 42 that connects a file system in a specified section of a disk into the existing server file system hierarchy 58. Moreover, the mount procedure call 42 can convert an operating system specific path name into a file handle. A file handle, as is known in the art, is a data-address structure that the server 14 can employ to communicate with the client 12. The file handle acts as a file pointer to a file of the file system. Typically, the file handle, or file pointer, is a system unique 32 bit number that identifies to the server 14 a file when the file is first opened and provides thereafter a handle the server 14 can employ to access the file pointed to by the handle. In one embodiment, the file sharing system 42 is the NFS system developed by Sun Microsystems of California that creates node arrays of file pointers for sharing a file system on a Unix platform. However, it will be apparent to one of ordinary skill in the art that any file sharing system that can mount a file system and generate a file handle that acts as a file pointer to the files of the file system, can be practiced with the present invention without departing from the scope thereof.

The client 12 includes a device driver 26. The illustrated device driver 26 controls a dynamic mount procedure 28, a dynamic dismount procedure 30 and one or more organization and management procedures 32. As described in greater detail herein after, to access an application program sorted at the Internet site, the device driver 26 activates the dynamic mount procedure 28. The mount procedure 28 creates a remote procedure call that is passed to the data transport interface and transported to the server 14.

Figure 4:
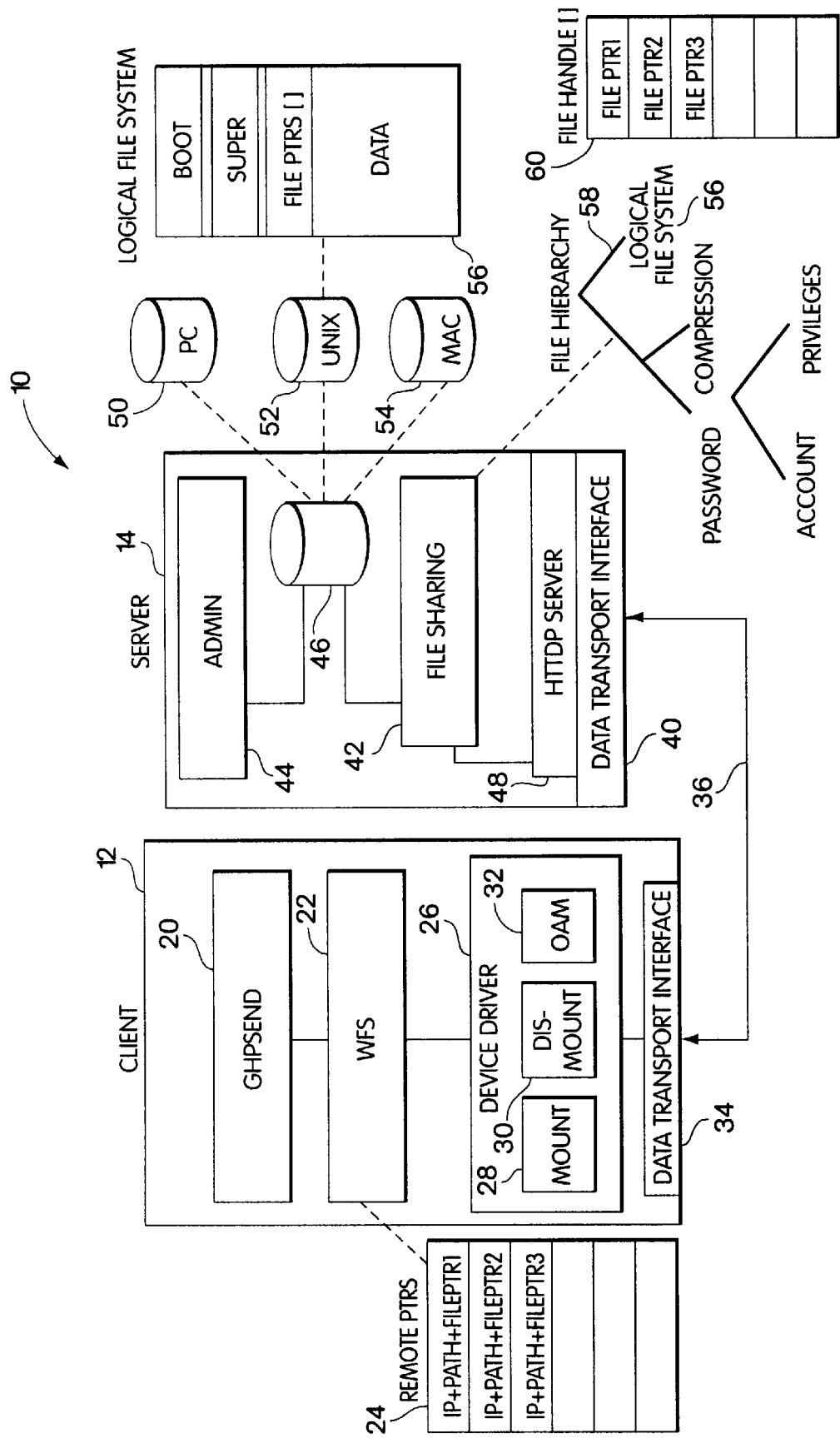
FIG. 4 illustrates the system of FIG. 1 having a mounted logical disk partition.

With reference to FIG. 4, which depicts the system 10 in a state after the client 12 has selected an application program for execution, the system 10 can be further explained. As depicted in FIG. 4, the system 10 includes the elements of FIG. 3 and the further elements of a server array of file pointers 60, a file hierarchy 58 that includes the logical file system 56 mounted at the client mount point of the file hierarchy 58 and an array of remote file pointers 24 that are maintained by the file system 22 of the client 12. The system 10 generates the server array of file pointers 60 and the array of remote file pointers 24 in response to the client 12 requesting to execute an application program stored within the logical file system 56.

In one embodiment, the client 12 employs the web browser program to contact a server process 48 running on server 14. The browser program provides the server process 48 with a client-type signal that indicates to the server process 48 the system type of client 12 and the file system protocol employed by client system 12.

In the depicted embodiment the server process 48 provides the administration program 44 with the client-type signal. The administration program 44 employs the client-type signal to determine a compatible logical file system that is to be provided to the client 12. In one embodiment, the administration program 44 determines the proper file system to be provided to the client 12 and provides the server process 48 with a pointer to a URL document that includes directory information signals that describe the directory structure of the file system 56 that is compatible with the client 12 and that will be made accessible to the client 12. The administration program 44 can provide the web server 48 with an HTTP URL that provides a hypertext page which graphically depicts the directory information signals. Optionally, the administration program 44 includes a page element that has a hypertext link program for generating a hypertext signal which represents the directory information signals as graphical icons which are hypertext links to further URL documents that provide further detail of the directory structure of the logical file system 56.

The server process 48 transports to the client 12 the directory information of the available logical file system 56 and further provides a data file that includes the Internet network address of the server 14 and a path name to the file system 56.

The connection element 20 receives the data file provided by the server process 48 and extracts the network address signal and the path name signal. The collection element 20 employs the network address signal and the path name signal to generate the array of remote file pointers 24 and to provide the mount procedure 28 with the necessary arguments to mount a file system such as system 56. Typically, the connection element includes a concatenation program to concatenate the address and pathname information to generate the proper mount point. In alterative embodiments, the connection element receives the proper mount point and file system name from the administration program. In a further step of the process, the browser program of client 12 displays to the client user a graphical depiction of the logical file system 56.

In one embodiment of the invention, the client user can request to execute an application program identified within the file system 56 by clicking on an application program. In response to the action of the user, the connection element 20 passes the necessary arguments to activate the mount procedure 28 that generates a remote procedure call directing the server 12 to mount the logical file system 56 that contains the application program requested by client 12, into the file hierarchy 58.

In one embodiment, the connection element 20 receives a data file from the server process 48 that provides the IP address of the server and the pathname to the files available to the client 12. In an alternative embodiment, the connection element 20 initiates a call to a port of the server process, such as well known port 80, that provides address information of the server 14. In one example, the client 12 can select to execute the application program XLANDER.EXE. Once the collection element has determined the network address and path name, the connection element 20 can activate the mount procedure to dynamically mount the file system that contains the file XLANDER.EXE. One such mount procedure 28 is understood from the following pseudo code.

```
int mount_fs(mntp)
struct mntent *mntp;
{
int error;
/* The mount procedure makes a MOUNT - TRAP call. This calls the
MOUNT - TRAP routine which is a call to an operating system library.
Such function calls are provided, as one example, by the Win library or
the SYS library. You could also write your own mount function.
      error = MOUNT_TRAP(type, mntp. flags, mnt_data);
      if (error < 0) {
           plog(XLOG_ERROR, "mount failed on %s: errno=%d",
                mntp->mnt_dir, errno);
           return (-1);
           }
}
main (argc, argv)
int argc;
char**argv;
{
/* The main routine receives the host name and the mount point
name from the collection
program */
hostname = argv[1];
mp_name = argv[2];
/* the main routine then reformats the name of the file system that is to be
mounted to format the file name for the web server process.
Typically the file extension ".wfs" is added to denote the world wide
web file system */
fs_name =compute_fs_name(argv[1]);
/* the main routine then packs the file system name, the mount point
name, a mount type field into a structure. */
mntp->mnt_dir=mp_name;
mntp->mnt_fs_name=fs_name;
mntp_>mnt_type=MNTTTYPE_WWFS;
/* The main that issues calls a mount file system procedure
that operates on the mntp structure*/
ret=mount_fs(&mntp, flags, (caddr-t) &nfs_args, 1,
MOUNT_TYPE_NFS);
return ret;
}
```

As illustrated by the above pseudo code, the mount procedure 28 receives from the collection element 30 two arguments that represent the file system to mount and the mounting point for the file system. The mount procedure 28 can then create a remote procedure call for the file sharing system 42 to activate the mount procedure 62. The mount procedure 62 mounts into the server file hierarchy 58 the file system, such as file system 56, which includes the executable program file for the XLANDER.EXE application program. The mounted file system can now be accessed.

Figure 5:
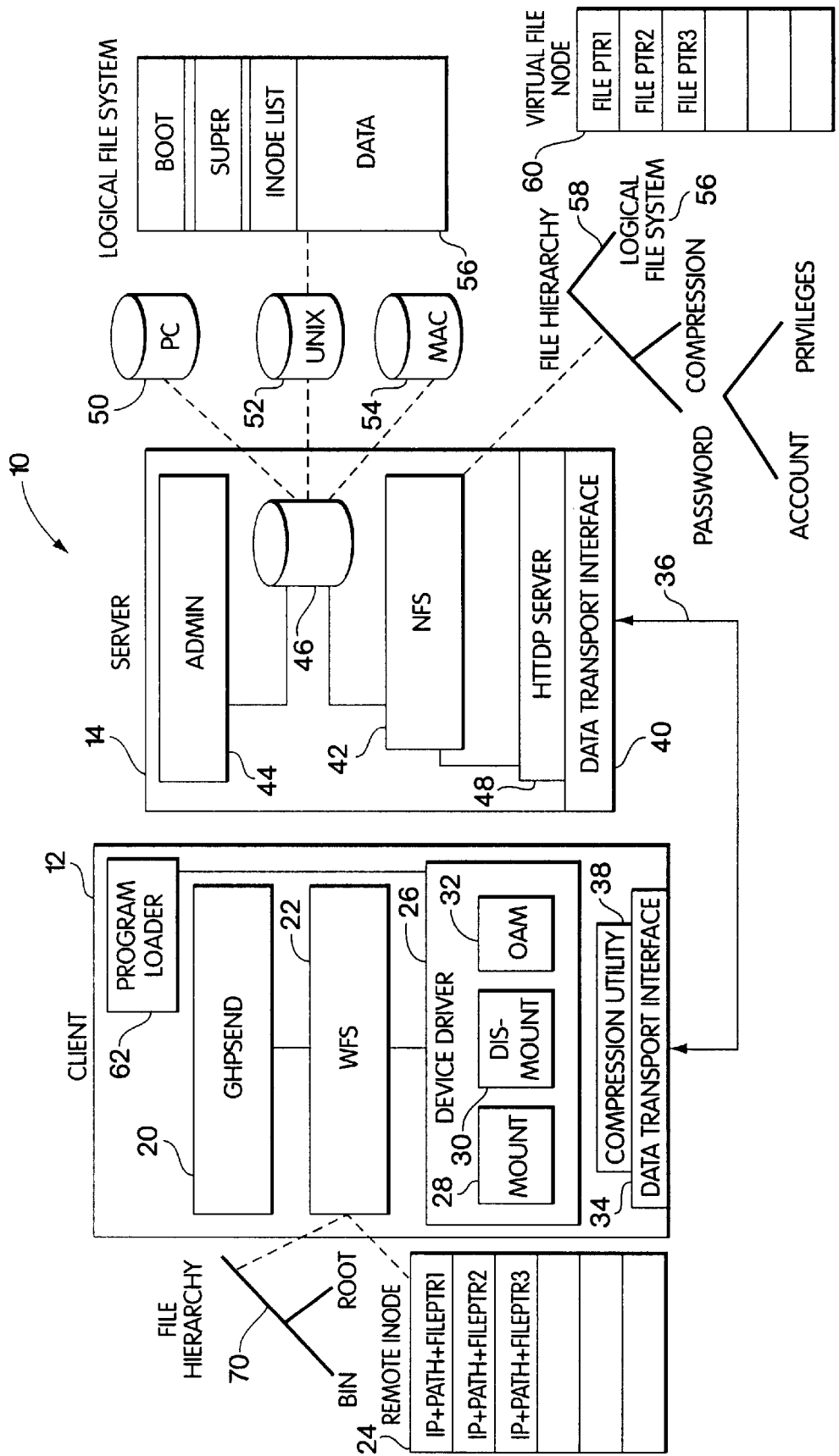
FIG. 5 illustrates the system of FIG. 1 having an array of file pointers integrated into the hierarchy of the client file system for providing the client program loader with entry points to application programs stored at the Internet site.

The file sharing system 42 is a program element that creates an array of file pointers 60, depicted as file ptr 1–n, that represent the locations of the disk 46 that contain the executable code for XLANDER.EXE. In one embodiment, the server process 48 provides the client 12 with a copy of the file pointers. However, any system for providing the client with a copy of the file pointers 60 can be employed by the present invention without departing from the scope thereof As depicted in FIG. 5, the connection element 20 opens a file having the copy of the file pointers 60 and generates the array of remote file pointers 24. Each remote file pointer 24, depicted as IP+PATH+FILEPTR, is a handle, through the mounted disk partition, and to a physical location on the mounted disk 46 that can be employed by the client 12 as access points to the physical location of the disk 46 that contains the executable code for the XLANDER.EXE. In one embodiment of the invention, the array of remote file pointers is provided to the client 12 by integrating the array of file pointers into the file hierarchy of the client 12. It will be understood that any connection element suitable for providing a remote file pointer to a file system can be practiced with the invention, including connection elements that employ a concatenation routine for forming pointers by concatenating a server address signal with a pathname signal and a file pointer signal, such as a connection element that forms a string WWW.EPICON.COM: USR/LOCAL/STORE/XLANDER.EXE, where WWW.EPICON.COM is a server address representative of an IP address, USR represents the disk 46, and /LOCAL/STORED/XLANDER.EXE represents the pathname signal.

FIG. 5 further depicts that client 12 can include a program loader element 62. The program loader element depicted in FIG. 5 connects to the device driver 26 and employs the device driver 26 to access the executable file selected by the user of client 12. The device driver 26 searches the file hierarchy of the client 12 and identifies the remote file pointer which points to a first block of code of the selected executable program. The device driver 24, which interfaces with the data transport interface 34, accesses the file block of executable code by requesting a transfer of the file block from the disk 46. The program loader can run the process within a window in the browser process. For example, in one embodiment, the client 12 was configured to run the WINDOWS 95 operating system and employed the program loader supplied under that operating system. However, it will be apparent that any program loader suitable for employing file pointers for loading executable code can be employed with the present invention without departing from the scope thereof.

FIG. 5 further depicts a compression program 38 for compressing data being transferred across the path 36. In this embodiment, the server process 48 also includes a compression routine for compressing and decompressing data transmitted by the data transport layer. In one embodiment, the invention provides a compression program that performs a huffman encoding procedure, however it will be apparent to one of ordinary skill in the art that the substitution of alternative encoding processes does not depart form the scope of the invention. In a further preferred embodiment, the system 10 includes a caching system that allows the server 14 to cache data file blocks being read from the disk 46 and being prepared for transport to the client 12. The caching system can be any caching system that stores in a high access speed memory a buffer of data blocks for transfer to the client 12.

Figure 6:
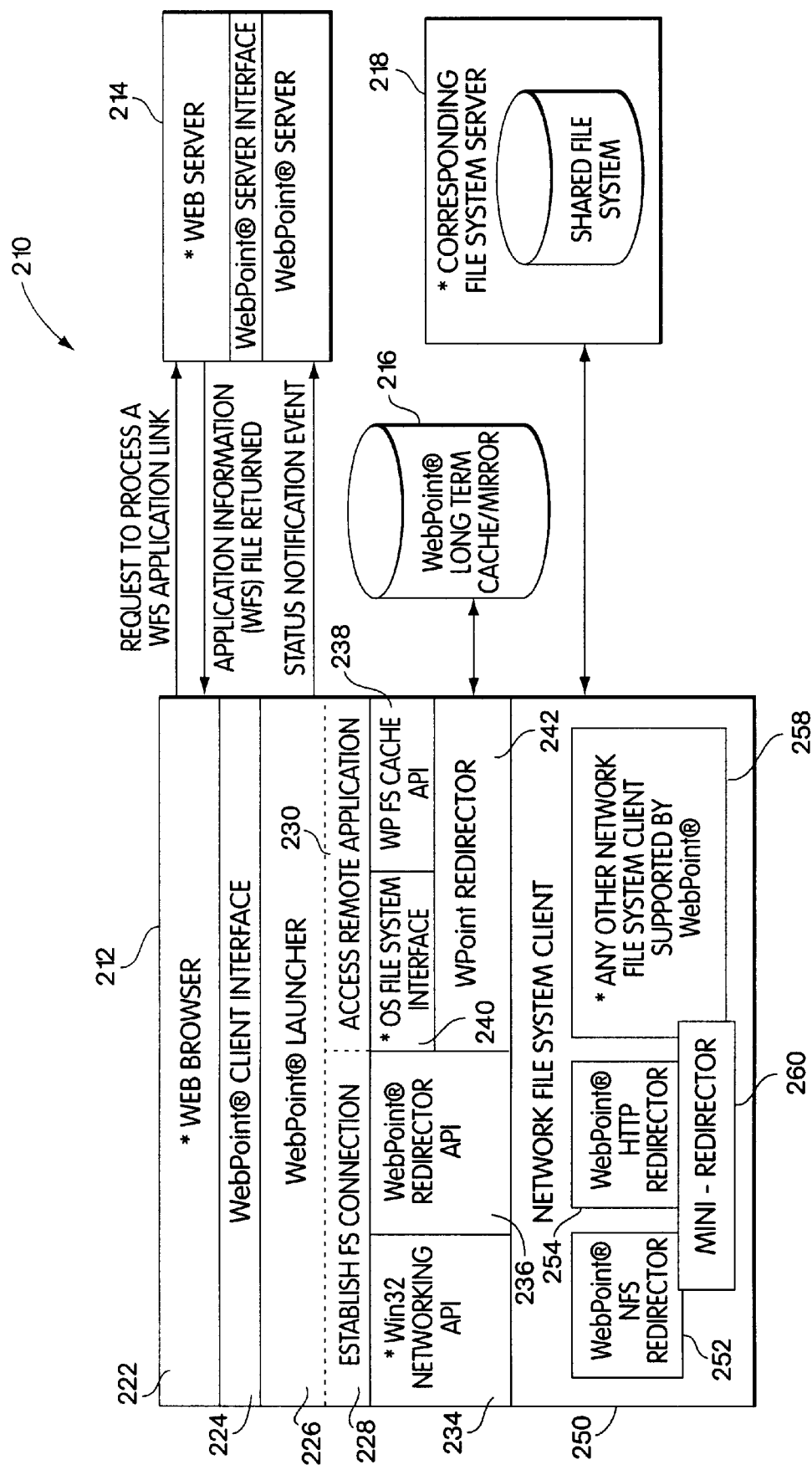
FIG. 6 illustrates an alternative embodiment of a system according to the invention.

FIG. 6 figuratively depicts the components and interaction of an alternative system according to the invention that includes a cache memory system, an HTTP redirector and a cache redirector. In particular, FIG. 6 depicts a system that includes a client element 212, am HTTP server 214, a cache system 216, a file system server 218, a browser 222, a browser interface 224, a launcher program 226, a file system connection process 228, a remote access connection 230, a networking API 234, a redirector API 236, a file system cache API 238, an operating system file system interface 240, a cache redirector 242, a network file system client 250, an optional NFS redirector 252, an HTTP redirector 254, a further redirector 258, and a mini-redirector kernel element 260.

The browser 222 can be a browser as described above and the client interface 224 can be an interface process, such as a Netscape plug-in, Active-X process, or any similar process, that interfaces the browser program 222 with the other elements of the client 212.

Similarly, the launcher program 226 can be an Active-X application, a plug-in or any other computer process that can be activated by the browser program 222. The depicted launcher program is a computer process that can retrieve from the server 214 the application information file associated with the activated application, mount the shared file system containing the remote application components, and responsive to the information in the application information file, create a selected environment within the client 212 to start and run the application. The launcher program 226 can monitor the application execution and notify the server 214 when the application terminates.

The launcher program 226 can execute either a remote or a cached application. To this end, the depicted launcher 226 interfaces to the file system connection process 228 that allows the launcher to interface to the client file system and to mount a remote file system to the file system of the client. Such a process for mounting a file system is described above. Similarly, the launcher program 226 can interface with the remote access process 230 that allows the launcher to access the remote application being executed by client 212. The remote access process 230 can dynamically deliver blocks of executable code. The code can be loaded, as described above into the client program memory and optionally, stored within the cache memory 216 in a directory structure that mirrors the directory structure of the server 214. For this reason, the remote access process 230 can interfere with the cache API 238 to control the storing and retrieval of data within the cache memory 216.

Figure 7:
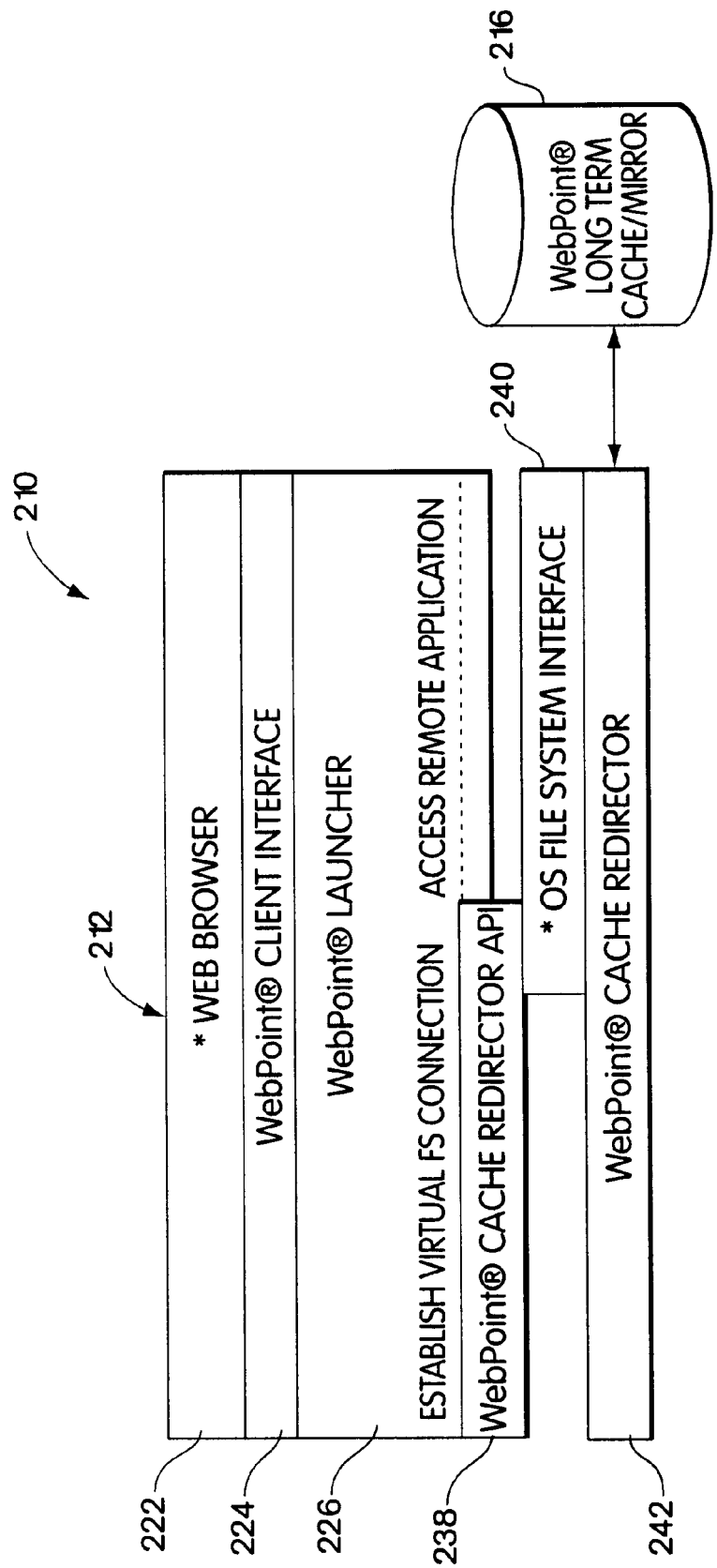
FIG. 7 illustrates the system of FIG. 6 employing a cache memory for accessing an application program.

FIG. 7 depicts, that in addition to running remote applications from the network through web pages presented by a server 214, applications can also be run from the cache memory 216, optionally by activating links in an Off-line page. The Off-line page can be an HTML page stored locally on the client 212, and can have links to applications stored in the cache memory 216, for launching these cached programs. Moreover, the client can also include a process for automatically launching applications from the cache memory. Typically, this process is included in the cache redirector 242. This process can determine if the same application is available from both the server and the cache. If accessing the cache is more efficient, the process will launch the cached version of the application.

As described above, the operating system handles the request to load the remote application and routes file system requests to access remote application files to the appropriate network file system redirector. This can also include routing the requests to the cache redirector 242. The cache redirector 242 intercepts certain file system requests for remote files stored on the created virtual drive associated with the remote application. The cache redirector can determine whether the requested file has been cached. If the requested file has been cached the cache redirector 242 compares file attributes of the file in the local cache memory 216 with the attributes of the remote file. If the attributes indicate the remote files have been changed, the cache redirector deletes the cached copy.

If the requested file cannot be taken from the cache memory 216, the cache redirector 242 passes the request to one of underlying network file system clients. The cache redirector 242 then finds a space in the cache memory to store that file and marks it to be cached when the OS file system reads the file from the shared network file system. After collecting the file, the cache redirector 242 returns the file to the OS file system in response to the file system request.

After the application terminates, the launcher process 226 performs cleanup and disconnects the drive/universal naming convention (UNC) connection, restores the environment to the original state, queries the cache redirector 242 about all remote applications which have components that have been fully cached. Updates the Off-line page, copying off-line application information files to an install directory, and adds a link for the any new entry into the Off-line page and/or removes any links that a file bumped out of the cache 216. The client 212 notifies the server 214 of the application termination event, or of execution failure event. The server 214 can then perform any necessary metering management required for the application.

In addition to the information described above, the application information file can contain information for the Off-line Page. This can include an Off-line allowance flag. If this flag is not set, the launcher 226 will not attempt to add the remote application represented by this application information file to the Off-line Page. This flag can be set by the server administrator program when the web administrator creates or updates the application information file. This information can also include the list of the components of the remote application that are to be cached in the cache 216 to run the application off-line. This list can also be set by the server administration program when the web administrator creates the application information file. Optionally, the list can include an Off-line preload request flag. This flag is set to indicate to the launcher 226 that the user requested to add the remote application represented by the application information file to the Offline Page. The launcher 226 can include a process that will preload all of the components of the remote application to the cache memory 216 and update the Off-line Page, but not launch the remote application. The preload process can operate by generating the proper file requests for the selected application programs, and sending the file requests to the HTTP redirector.

In one embodiment, the launcher can present a hierarchy of all "known" web servers running a server process according to the invention. The launcher can list the "known" application links on each of these servers. The launcher will obtain a list of "known" servers and/or their application links when the launcher starts execution. The list of servers can be obtained by sending a query request to a proxy server which is setup to be aware of other server processes according to the invention. The list of application links can then be obtained by sending a query request to a specific server. All application links returned from the query request can then be displayed in a window of the launcher.

Although the launcher process can be coded in any suitable way, an embodiment can be a 32-bit application for Windows 95 and Windows NT 3.51/4.0 platforms, a 16-bit application for Windows 3.1, or a process ported for operation on a UNIX, OS/2, and MAC platform.

Returning to FIG. 6, it can be seen that the cache memory system 216 can act as a database on the client's local disk which caches, or mirrors, remote applications and associated files when an application is run via clicking on an application link. The database can be located in a hidden directory under a client installation process directory. Files can be stored in the cache in a different format than the directory structure on the server, and therefore cannot be interpreted by a local user directly. The cache 216 can improve performance by avoiding the need to run remote applications over slow links. On subsequent requests to execute the same link, applications and associated files can be read from the cache rather than over the network. Additionally the cache can allow completely cached applications to be run from the Off-line page when there is no network connection to a remote file server containing the applications.

The depicted cache redirector 242 lies between the operating system's central file system control, and the installed network file systems. It connects the different file system services, NFS, HTTP, etc., to implement the file caching mechanism. All file system requests sent to this layer are routed to the appropriate network file system.

To this end, the network file system client 250 that can act as a multiple-protocol file system that takes remote I/O requests from the client and sends them to the appropriate server for processing. In the depicted embodiment, the network file system client 250 includes a plurality of redirectors that can act as a file system that takes remote I/O requests, for files, printers, serial ports, named pipes, mail slots, or other devices or abstractions, and sends the request to a server. As shown, each redirector in the network file system 250 can redirect I/O requests for use with a selected type of protocol for sharing files, data or devices.

The network file system client 250 can include a controller process that selects one of the plural redirectors for servicing a remote I/O request. The controller can select the redirector by determining from the I/O request, the server that has access to the requested data or device. Additionally, the controller can include a list that identifies application programs, or other data or devices, that are available from the multiple servers. The controller can select one of servers to access based on a characteristic or criteria such as the file systems or transport protocols available. For example, the NFS redirector may always be selected over the HTTP redirector, if an application program is available from both types of servers. Alternatively, the controller process can determine the transmission latency period, which defines the current response time of the network to a client request, to select the redirector of the faster network. The controller process can be part of a wrapper that encapsulates the plural redirectors and acts as an interface to the client operating system.

The NFS redirector 252 can be a file system client which handles requests to connect to exported remote file systems and to run remote applications shared by NFS servers. The NFS redirector 252 can be implemented as a VxD in Windows 95 and as an FSD in Windows NT. If Windows 3.1 and Windows for Workgroup are supported, then the NFS redirector 252 can be implemented as a redirector VxD. The core part of the redirector that provides NFS protocol, the protocol specific caching and the other features (that pertain to either the protocol or to the client redirector specific functions) common for all OS platforms can be implemented as a separate, OS independent, system component that is portable across the platforms. This core part is depicted in FIG. 6 as the mini-redirector 260. The shell of the depicted NFS redirector 252 is configured to support the client operating system and can be implemented as a network file system wrapper that is specific to client particular OS.

The depicted HTTP redirector 254 can act as a network file system client redirector which abstracts full URL pathnames, which are provided within the application information file. This provides an HTTP shared file system. The HTTP redirector 254 can then provide access to files within the HTTP shared file system by maintaining a Universal Naming Convention (UNC)/drive connection to the HTTP server directories. From the point of view of a remote application running on a local machine, the results of accessing files through the HTTP redirector 254 are the same as the results of accessing files through any other known network file system (i.e. Microsoft Network, or NFS). The HTTP redirector 254 can be a computer program implemented in the C++ computer language. The program can monitor or respond to file requests made by the client operating system. The program will process those file requests for files stored at an HTTP server. In one embodiment, the program translates the file system requests into HTTP compliant command signals, which can be processed by an HTTP server. The HTTP compliant command signals can include simple requests or full requests, including the GET command, or any other HTTP commands or methods suitable for communicating with an HTTP server. The server responds to the commands by transferring, according to the HTTP protocol, the files identified by the file handles generated from URL pathnames. This provides an HTTP shared file system that directs the HTTP server to act as a network device. The development of the HTTP redirector 254 follows from well known principles in the art of software engineering and the actual coding of such a redirector is within the skill of one of ordinary skill in the art of computer programming.

The HTTP redirector 254 works in tight integration with the cache memory 216. In alternative embodiments, the HTTP redirector 254 may provide a process for reading a portion of a file rather than requiring the entire file to be read at once. The HTTP redirector 254 will provide the read access to the remote application files. The limited write access can be provided, for example, by employing the HTTP PUT command.

It will be seen that an advantage of the HTTP redirector 254 is that the redirector 254 provides support for running application links over the Internet and through a firewall. Utilizing well known file system client and server software is sufficient for running application links over the Intranet, however allowing access to one of these well known file system servers over the Internet creates a security hole. Alternatively, an HTTP server can be placed on the network's firewall. All applications desired to be accessible from the Internet are to reside on that web server, and application links can be set up accordingly. The applications can then be run over the Internet via the HTTP redirector 254.

The HTTP redirector 254 can be implemented similarly to the NFS redirector, with a core portion implemented within a miniredirector and a wrapper for interfacing with the client OS.

Systems of the invention also provide for applications that are to be pre-installed. For example, if an application contains some system level components, for example, drivers, that need to be integrated with the OS during installation of that application or if installation requires client system reboot, such application is to be pre-installed. To address this, the invention provides remote installation of such applications onto the client, so the client can choose to install the remote application on the local machine. This method of installation runs the remote install or setup program on the client's machine and then the install program copies the necessary components of the application from a network drive that was mounted by the client.

Figure 8:
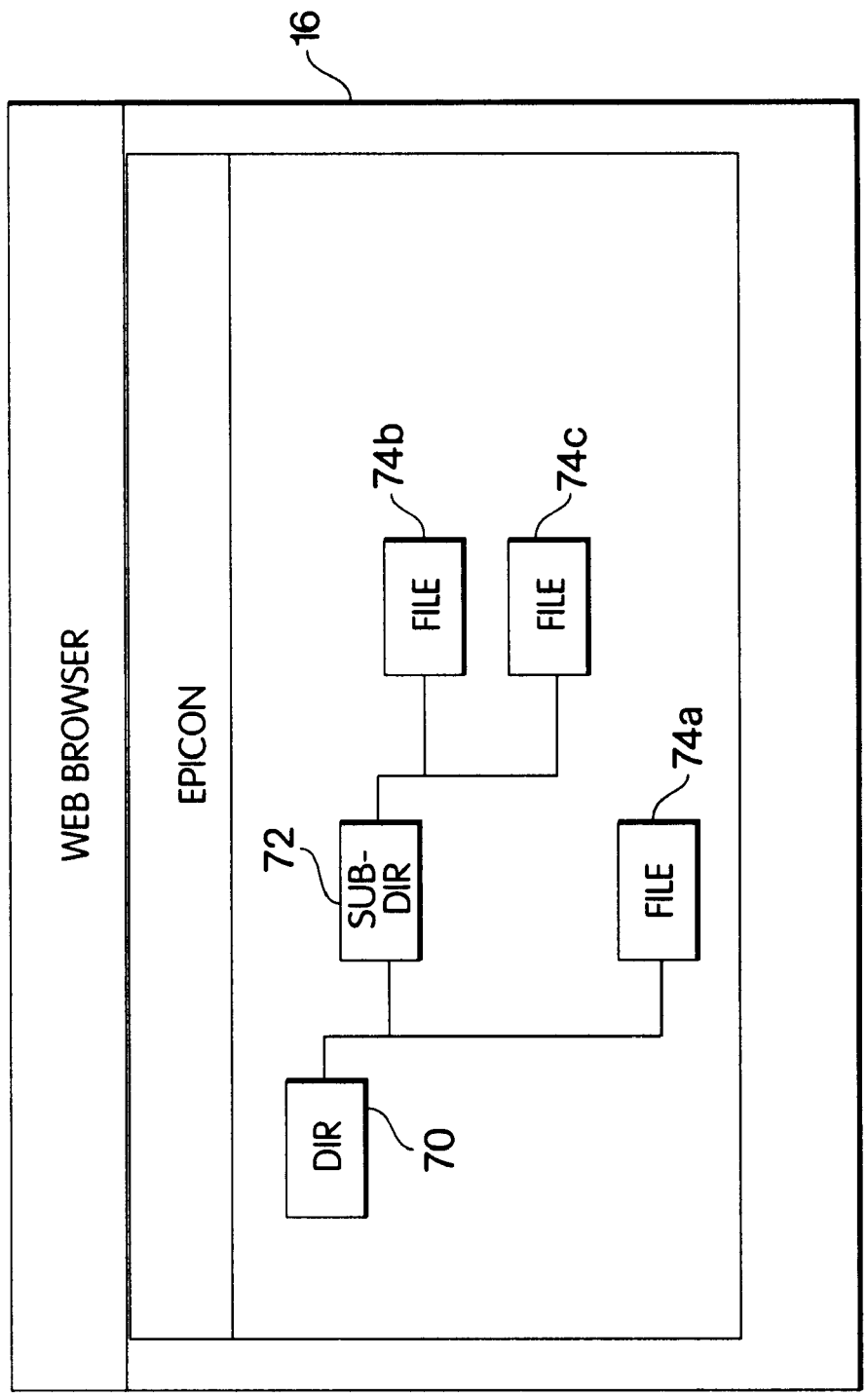
FIG. 8 depicts a graphical interface suitable for employment with the systems of FIG. 1 and FIG. 6 which provides a directory structure for accessing and executing application programs.

FIG. 8 depicts a graphical interface 16 that provides a directory structure of an application program. As depicted in FIG. 8, System 10 provides a graphical user interface 16 that displays within the window of the browser program 78. In the depicted embodiment of the invention, the graphical user-interface 16 is an HTML hyperlink page provided by the Web Server Process 48 and which includes hypertext links that graphically illustrate directory information signals that show the file system structure of a file system 56 that has been mounted into the file hierarchy of the server 14.

As illustrated in FIG. 8, the graphical user interface 16 provides the hypertext links as graphical icons that describe directory primitives, such as directory structures, sub directory structures, file structures, disk structures, or any other common file system structure. FIG. 5 illustrates one graphical file structure that includes a directory icon 70, a sub directory icon 72, and file icons 74A, 74B and 74C. In one embodiment of the invention, each icon is a hypertext link to a further HTTP URL which requests the Web Server Process 48 to download an additional HTML page that provides further information as to the directory structure of the mounted file system 56. It will be apparent to those of ordinary skill in the art that systems and processes according to the invention can be practiced without such graphical interfaces. Moreover, the construction of an HTML server process that provides multiple links to URL sites is well-known in the art of computer engineering, and any modifications, subtractions, or additions to the interface 16 depicted in FIG. 8 is deemed to be within the scope of one of ordinary skill in the art and it would not depart from the scope of the invention.

Figure 9:
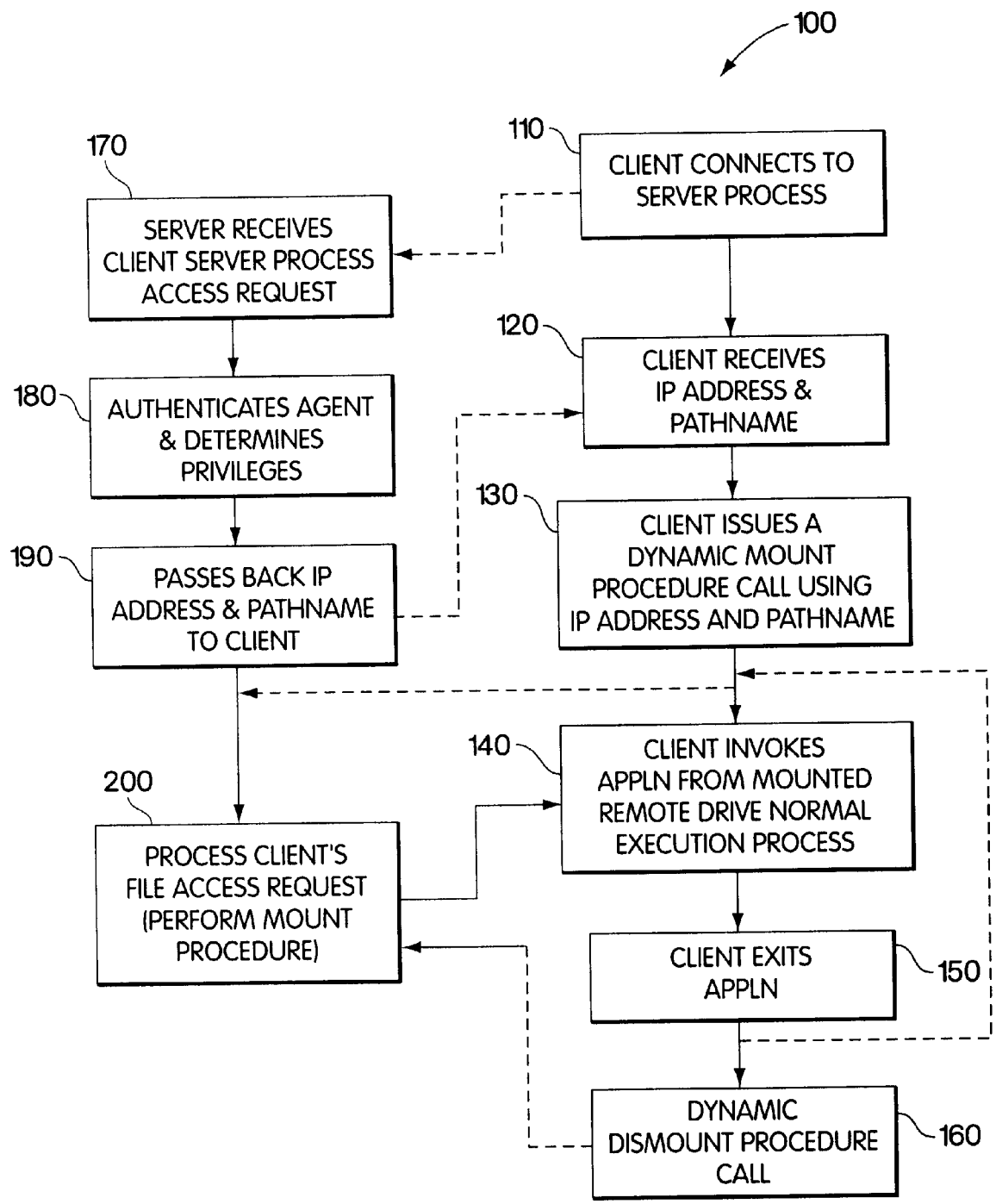
FIG. 9 is a functional block diagram of a process according to the invention for executing application programs from a Web Internet site.

FIG. 9 depicts a functional block diagram that illustrates one process according to the invention for allowing a client to connect to an Internet server for executing applications therefrom. As depicted in FIG. 9, the process according to the invention can be understood as two processes, a first running on a client computer, and a second running on the server computer, which operate in part independently from each other. FIG. 9 depicts the server process in the left hand portion of the Figure. The server process includes steps 170, 180, 190 and 200. The client process is depicted on the right hand side of FIG. 9 and includes steps 110, 120, 130, 140 150 and 160.

The process 100 begins with the client process step 110 that connects the client to the Web server process. As depicted in FIG. 9, step 110 of the client process causes the server process to perform step 170, which includes receiving the Web server access request to access a file. The server process continues to step 180 which is an optional step, where the server 12 authenticates the client and determines the access privileges afforded to their client by examining a client ID signal and a client privilege signal that are transmitted by the client to the server. After optional step 180, the server process continues to step 190 and passes back to the client the IP address signal and the path name signal.

In a preferred embodiment of the invention, step 190 also includes the step of passing back to the client an HTML page that graphically depicts the available application programs. As illustrated in FIG. 4, a client process proceeds to step 120, where the agent receives the IP address and the path name. Upon receipt of the IP address signal and the path name signal, the client process proceeds to step 130, and employs the IP address signal to generate a dynamic mount request. In a preferred embodiment of the invention, the client generates the dynamic mount request by a client activating a hypertext link that provides a dynamic mount request to the Web server process of the server 14.

As further depicted by FIG. 9, the dynamic mount request of the client process is passed to the server process and the server process proceeds from step 190 to step 200. In step 200, the server process processes the client's file access request and performs the mount of a remote system disk that contains the application file requested by the client. As described above, the process step 200 includes the step of generating an array of server file pointers that act as file handles to the data blocks of the application program.

As depicted in FIG. 9, step 200 passes a copy of the array of server file pointers to the client process which proceeds to step 140 and invokes the application from the mounted remote drive. In step 140, the client process follows the normal execution process of the client system by invoking the program loader to load file blocks pointed to by a remote array of file pointers which are generated by the client process as a function of the IP address, path name signal, and server file pointers.

As depicted in FIG. 9, the client process proceeds from step 140 to step 150 after execution of the application and exits from the application. As further depicted by FIG. 9, the client process can proceed to step 160 where it issues an optional dynamic dismount drive request that transfers control of the process 100 to the server process which process the client's dismount request and removes the mounted drive from the server system file hierarchy. The dynamic dismount request creates a remote procedure call for the file sharing system 42 to dismount the specified file system, typically the file system mounted by the mount procedure 28. The construction of the dismount procedure 30 is similar to the mount procedure 28 described above.

As further depicted by FIG. 9, the process 100 can continue to operate after step 150, allow the client 12 to select a next application program for executing. Remote application as the term is employed herein shall be understood to encompass a single executable file, as well as the set of directories containing the components to run an application, as well as a set of rules (environment variables, changes to the Registry and to other system configuration files) that are to be applied on the local machine to run that application.

It will thus be seen that the invention efficiently attains the objects set forth above, among those made apparent from the preceding description. It will also be understood that changes may be made in the above construction and foregoing sequences and operations without departing from the scope of the invention. For example, the invention can be understood to include primitives embedded into an application program or a programming language, that allow the application program or the programming language to mount a remote disk and execute application programs from that disk over an Internet connection. As an example, it will be understood that an application program that include the functionality to communicate to a data transport layer, can employ the systems and process of the invention to allow a user to access and execute, from within the application program, a second program located on a disk linked to a server site. Furthermore, it will be understood that an operating system can be adapted to include the systems and processes of the invention.

It accordingly is intended that all matters shown in the accompanying drawings be interpreted as illustrative rather than in any limiting sense. It is also to be understood that the following claims are intended to cover all of the generic and specific features of the invention as described herein, and all statements of the scope of the invention which as a matter of language, might be said to fall therebetween.

We claim:

1. Method for allowing a client to execute an application program stored on a memory device linked to an HTTP server, comprising the steps of
   mounting a remote file system containing the application program and being linked to the HTTP server,
   monitoring the operating system to detect file system requests for files stored within said remote file system, and
   passing the file system requests to a redirector element for translating the file system requests into HTTP compliant signals, for transmission across a network.

2. A method according to claim 1, wherein said redirector element processes, responsive to said file system request, a URL pathname to generate a signal for accessing a file stored within said remote file system.

3. A method according to claim 1, wherein said step of mounting includes the step of generating an array of file-pointers representative of pointers to files associated with said application program.

4. A method according to claim 1, comprising the further step of providing plural redirector elements for translating said file system requests into selected transport protocols.

5. A method according to claim 4, wherein said step of providing plural redirector elements includes the step of providing an NFS redirector element for translating requests into NFS compliant signals.

6. A method according to claim 4, wherein said step of providing plural redirector elements includes the step of providing a SMB redirector element for translating requests into SMB compliant signals.

7. A method according to claim 4, including the further step of, selecting one of said plural redirector elements to translate said file system requests.

8. A method according to claim 7, including the step of selecting said redirector as a function of said file system.

9. A method according to claim 7, wherein said client couples to a plurality of networks and including the further step of selecting said redirector as a function of comparing the transmission latency time characteristic for each of said plural networks.

10. A method according to claim 7, wherein said client couples to a plurality of networks and including the further step of selecting said redirector as a function of the transmission protocols of said plural networks.

11. A method according to claim 4, including the step of providing said plural redirector elements with a wrapper for interfacing said redirectors with said operating system.

12. A method according to claim 1, including the further steps of providing said client with access to a cache memory for cache storing portions of said remote file system containing said application program, and providing a cache redirector element for directing said client to access said portions of said file system stored within said cache memory.

13. A method according to claim 12, including the step of directing said cache memory to mirror said file system.

14. A method according to claim 12, wherein said step of cache storing said portion of said file system includes the step of storing said portion of said file system according to a file structure employed by said server.

15. A method according to claim 12, including the step of providing an Off-line page having at least one link to an application program stored within said cache memory.

16. A method according to claim 12, including the further step of providing a preload control for allowing said client to store selectively an application program within said cache memory.

17. A method according to claim 1, including the step of providing a process for directing said server to execute said application program within a program memory of said server.

18. A method for allowing a server to provide remote execution of an application program stored on a memory device linked to said server, comprising the steps of
   generating an application information file representative of files associated with said application program,
   generating a link representative of a pointer to said application information file,
   detecting a request from a client to execute said application program, and transmitting, responsive to said request, data signals to said client representative of said files associated with said application program.

19. A method according to claim 18, wherein said step of generating an application information file includes the step of generating information representative of a file structure associated with said files of said application program.

20. A method according to claim 18, wherein said step of generating an application information file includes the step of generating a file having information representative of an operating environment for said application program.

21. A method according to claim 18, including the further steps of providing said server with a link to a second server, and directing said server to identify to said client application programs stored on said second server and available for execution by said client.

22. A method according to claim 18, including the further step of providing a metering process for monitoring the number of clients running said application program.

23. A method according to claim 18, including the further step of providing an access control process for allowing said server to control access of said client to said application program.

24. A method of allowing a client to install an application program stored on a memory device linked to a server, comprising the steps of
   providing said server with access to an installation program for installing said application program for operation by said server,
   generating an application information file representative of files associated with said installation program,
   detecting a request from said client to install said application program, and
   transmitting to said client, responsive to said application information file, data representative of said files associated with said installation program.

25. A method according to claim 24, including the step of generating an application information file having information representative of files associated with said application program.

26. A method according to claim 24, comprising the further step of
   providing said client with access to a cache memory for cache storing portions of a file system containing said application program, and
   providing a cache redirector element for directing said client to access said portions of said file system stored within said cache memory.

* * * * *